United States Patent [19]

Chang

[11] Patent Number: 5,347,611
[45] Date of Patent: Sep. 13, 1994

[54] APPARATUS AND METHOD FOR TRANSPARENT TONE PASSING OVER NARROWBAND DIGITAL CHANNELS

[75] Inventor: Hyokang Chang, Potomac, Md.

[73] Assignee: Telogy Networks Inc., Gaithersburg, Md.

[21] Appl. No.: 822,316

[22] Filed: Jan. 17, 1992

[51] Int. Cl.$^5$ .............................. G10L 7/00; G10L 7/06
[52] U.S. Cl. .................... 395/2.15; 395/2.16; 395/2.35
[58] Field of Search ............... 379/6, 63; 395/2, 2.15, 395/2.35–2.37, 2.16; 381/37–39, 46–49

[56] References Cited

U.S. PATENT DOCUMENTS

| | | | |
|---|---|---|---|
| 4,027,102 | 5/1977 | Ando et al. | 381/46 |
| 4,296,277 | 10/1981 | Daneffel | 381/46 |
| 4,303,803 | 12/1981 | Yatsuzuka | 395/2 |
| 4,694,482 | 9/1987 | Reesor et al. | 379/6 |

OTHER PUBLICATIONS

"IEEE Dictionary of Electrical and Electronics Terms," Frank Jay, editor, 1984, IEEE, Inc., p. 280.

*Primary Examiner*—David D. Knepper
*Attorney, Agent, or Firm*—Thomas M. Champagne; Jon L. Roberts

[57] ABSTRACT

A method of passing tones transparently over narrowband channels without having to detect the tones at the transmit side is described. This method requires neither separate handling of tones for the transmission purpose, nor prior knowledge of the characteristics of the signaling tones used. It is a relatively general method that can be applied to systems using a variety of speech coding techniques utilizing a frame structure.

12 Claims, 2 Drawing Sheets

APPARATUS AND METHOD FOR TRANSPARENT TONE PASSING OVER NARROWBAND DIGITAL CHANNELS

BACKGROUND OF THE INVENTION

1. Field of the Invention

This invention relates generally to voice communication over narrow band digital channels and more specifically to the passing of signalling tones in a transparent manner, i.e. without the need to detect them.

The novelty of the invention lies in the use of two signal encoders, one for speech and the other for tones, in a dynamic manner for a given signal frame. There is no need for handling signalling tones separately from speech signals.

2. Background

In narrowband digital voice communications, speech signals are compressed and encoded for transmission by means of speech coding. Speech coding, however, performs poorly on nonspeech signals such as DTMF tones or supervisory tones. When passing of such tones is required, it is typically handled separately from speech coding process by detecting the tones at the transmit side. The detector output, such as a DTMF digit or the presence of a certain tone, is then sent to the receiver via a signal or control channel to implement regeneration of corresponding tones at the receive side. This process is illustrated in FIG. 1.

This approach, however, assumes that the characteristics of tone detectors at the receive end are previously known since the signalling information is extracted at the transmit side. Another potential problem with this approach is the delay associated with tone detection and regeneration. For example, if a tone detector requires 100 milliseconds for detection, then the tone detector output will not be available until after 100 milliseconds.

SUMMARY OF THE INVENTION

The method proposed herein provides a transparent means to pass tones accurately over narrowband digital channels without having to detect the tones at the transmit side. Thus, it requires neither the separate handling of tones for the transmission purpose, nor the prior knowledge on the signalling tones used. It is a relatively general method that can be applied to a variety of speech coding techniques utilizing a frame structure.

DETAILED DESCRIPTION OF THE INVENTION

Figure 1:
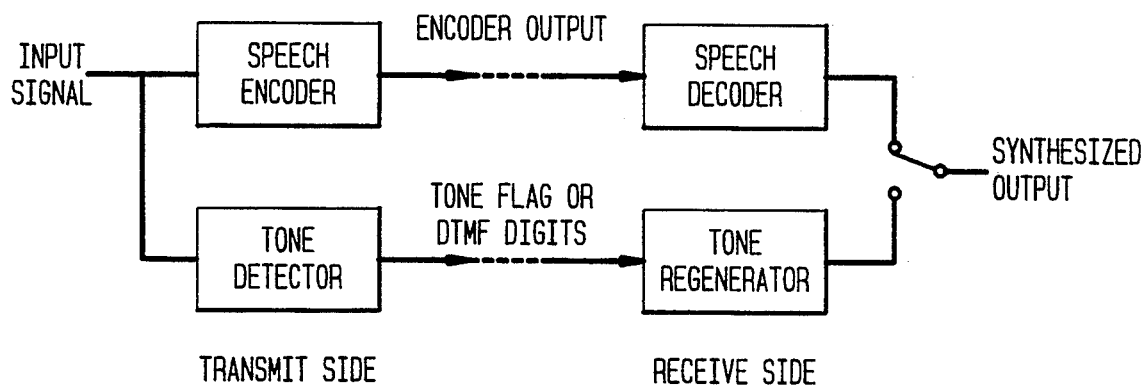
FIG. 1 illustrates the typical (prior art) approach to handling signalling tones over narrow band digital channels.
Figure 2A:
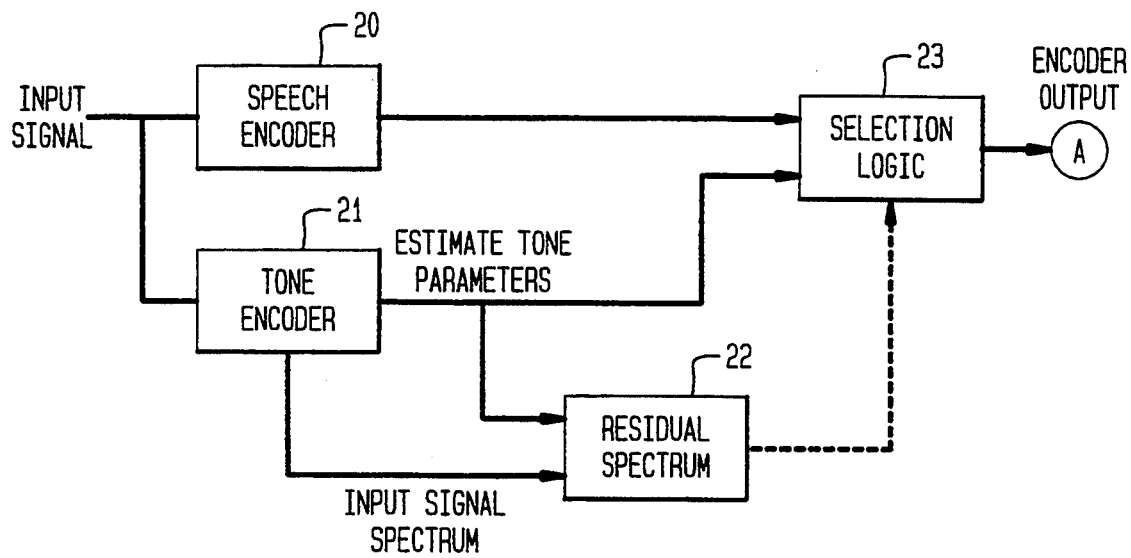
FIG. 2 illustrates the method of this invention for transparent tone passing, FIG. 2(a) on the transmit side and FIG. 2(b) on the receive side.

In the method of this invention, two different types of encoders are employed for signal encoding on the transmit side, one for speech [20] and the other for tones [21], as shown in FIG. 2(a). Initially, a set of input samples or a speech frame is applied to the tone encoder [21], which attempts to approximate the amplitude spectrum of input samples by a set of N tones. The residual spectrum [22] is then derived by taking the difference in amplitude spectra between the input and the tone encoder output. If the residual spectral power turns out to be below a certain threshold, indicating that the tone encoder [21] has been successful in encoding the input signal samples, the tone encoder output is selected by the selection logic [23] for transmission for that particular signal frame. If the residual spectral power is above this threshold, indicating that the input may not be of tonal type, the speech encoder output is selected.

Figure 3A:
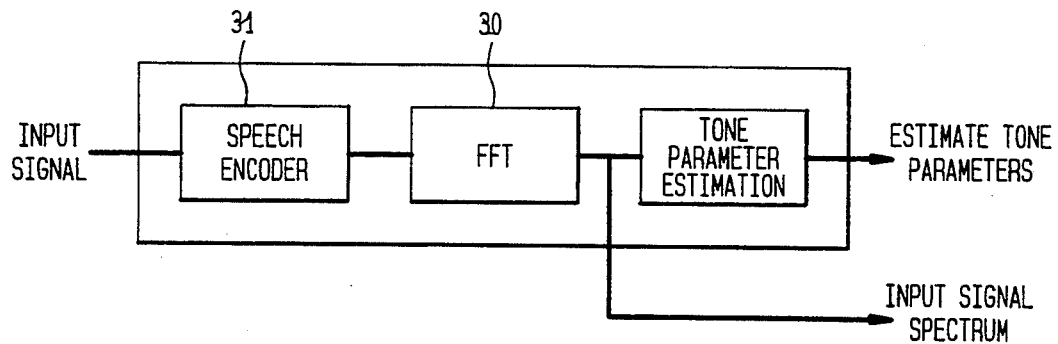
FIG. 3(a) shows the tone encoder functional blocks.
Figure 3B:
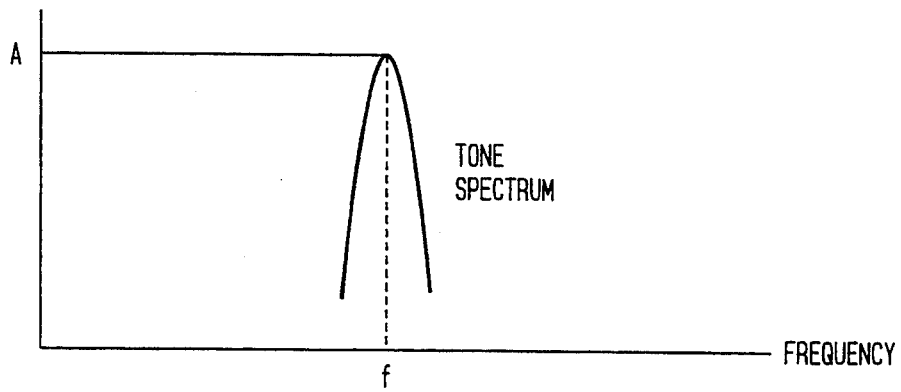
FIG. 3(b) shows the spectrum of an extracted tone.

For tone encoding, a fast Fourier transform (FFT) [30] is applied to a set of input samples with appropriate windowing [31] as shown in FIG. 3. A tone is then extracted by searching for a peak value of the amplitude spectrum, the tone represented by two parameters, namely frequency and amplitude. The amplitude spectrum of the tone just extracted is then subtracted from the amplitude spectrum of the input and a search for the next tone is performed. This process continues until N number of tones are extracted and the resulting spectrum after the extraction process forms the residual spectrum [22]. For DTMF/MF applications, it suffices to set N to 2.

Figure 2B:
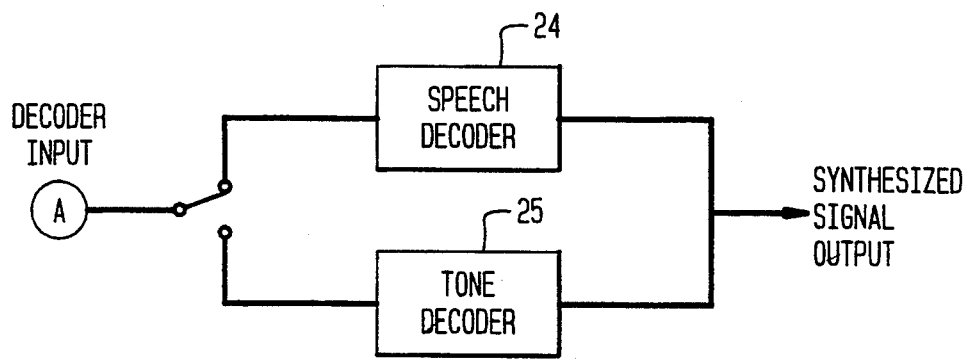

The type of encoder (i.e. speech or tone) used on the transmit side is made known to the receive side by the addition of a frame type indicator to the encoder output. Depending on the frame type indicated, the received data will be decoded either through the speech decoder [24] or the tone decoder [25] (see FIG. 2(b)).

Upon detecting tone frames, the tone decoder [25] generates a set of tones using the frequency and amplitude information received. The tone decoder produces the output by maintaining both amplitude continuity and phase continuity at frame boundaries. At transitions between speech and tone frames, an overlap-add or an equivalent technique should be applied in order to maintain smooth transitions in the synthesized output at frame boundaries.

Figure 4:
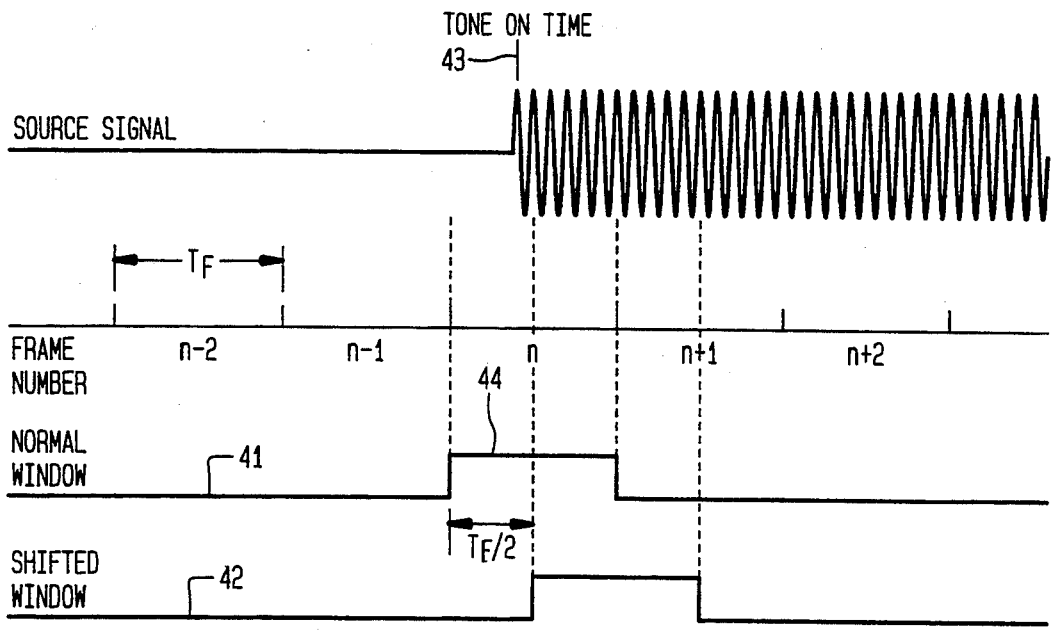
FIG. 4 illustrates the use of two windows for improved resolution of the tone signal in time.

To increase the resolution of tone on/off time, the tone encoder [21] may use more than one window in determining whether or not the tone encoder [21] is to be used. FIG. 4 illustrates the case where two windows [41], [42] are employed to reduce the uncertainty in tone on-time [43]. In this example, the input samples within the normal window [41] at frame n may not activate the tone encoder [21] since the front part of the window [44] does not contain tone samples. The samples within the shifted window [42], however, will activate the tone encoder [21] since the tone is present over that entire window, and tones will be correctly generated from frame n rather than from frame n+1 at the receive side. More windows may be used depending on the required tolerance of the system in use.

A preferred embodiment of the invention has now been described in detail. It is to be noted, however, that this description of this specific embodiment is merely illustrative of the principles underlying the inventive concept. It is therefore contemplated that various modifications of the disclosed embodiment will, without departing from the spirit and scope of the invention, be apparent to persons skilled in the art.

What is claimed is:

1. A narrowband digital channel signal passing system comprising:

a transmit side and a receive side, the transmit side being electronically linked for communication with the receive side, input means on the transmit side for receiving input signals, the input signals including voice communication input signals and tone signals, speech signal encoding means connected to the input means and located on the transmit side for encoding the input signals in a manner desirable for speech signal coding, the speech signal encoding means providing a speech encoded output signal, signal transform means connected to the input means and located on the transmit side for providing an input signal spectrum by extracting amplitude and frequency spectra from the input signals, tone signal encoding means connected to the signal transform means and located on the transmit side for encoding the input signal spectrum in a manner desirable for tone signal coding to provide a tone encoded output signal, comparison means for comparing the input signal spectrum with the tone encoded output signal providing a residual spectrum having an amplitude, means for determining if the amplitude of the residual spectrum is greater than or less than a threshold level, and selection means for providing the speech output signal to the receive side if the amplitude is greater than the threshold level and for providing the tone encoded output signal to the receive side if the amplitude is less than the threshold level.

2. The narrowband digital channel signal passing system of claim 1 wherein the signal transform means comprises means for performing a fast Fourier transform operation.

3. The narrowband digital channel signal passing system of claim 2, wherein the signal transform means further comprises sample windowing means for sampling the input signal prior to the fast Fourier transform operation.

4. In a communication system, a method for passing signals comprising the steps of:

generating an encoded speech output by encoding input signals in a manner desirable for speech signal coding, extracting an input signal spectrum from the input signals, generating estimated tone parameters by encoding the input signal spectrum in a manner desirable for tone signal coding, generating a residual spectrum level representing the difference between the input signal spectrum and the estimated tone parameters, providing the encoded speech output to a decoder if the residual spectrum level is greater than a threshold value, and providing the estimated tone parameters to a decoder if the residual spectrum level is less than a threshold value.

5. The method of claim 4, wherein the step of extracting an input signal spectrum includes the step of performing a fast Fourier transform operation.

6. The method of claim 5, wherein the step of extracting an input signal spectrum includes defining a window of time during which the extracting will take place.

7. The method of claim 6 wherein the step of defining a window of time includes the step of aligning a first window of time with a frame of the input signal.

8. The method of claim 7 wherein the step of defining a window of time includes the step of defining at least one additional window of time which overlaps but does not coincide with the first window of time.

9. The method of claim 8, further including the step of shifting estimated tone parameters corresponding to an additional window of time such that the estimated tone parameters align with the first window of time.

10. A narrowband digital channel signal passing system comprising:
A) a transmit side and a receive side, the transmit side being electronically linked for communication with the receive side;
B) input means on the transmit side for receiving an input signal, the input signal including a voice communication component and a tone component;
C) speech signal encoding means connected to the input means for providing a speech encoded output signal;
D) signal transform means connected to the input means for providing an input signal spectrum;
E) tone signal encoding means connected to the signal transform means for providing estimated tone parameters;
F) comparison means for providing a residual spectrum having an amplitude corresponding to the difference between the input signal spectrum and the estimated tone parameters;
G) means for determining if the amplitude of the residual spectrum is greater than or less than a threshold level; and
H) selection means for providing the speech output signal to the receive side if the amplitude is greater than the threshold level and for providing the estimated tone parameters to the receive side if the amplitude is less than the threshold level.

11. The narrowband digital channel signal passing system of claim 10, wherein the signal transform means comprises means for performing a fast Fourier transform operation.

12. The narrowband digital channel signal passing system of claim 11, wherein the signal transform means further comprises sample windowing means for sampling the input signal prior to the fast Fourier transform operation.

* * * * *